No. 11,939. Reissued Oct. 15, 1901.

J. F. OHMER.

MECHANISM FOR OPERATING FARE REGISTERS.

(Application filed Feb. 20, 1901.)

3 Sheets—Sheet 1.

WITNESSES.
Matthew Siebler.
C. M. Theobaed.

John F. Ohmer.
INVENTOR.
By R. J. McCarty,
ATTORNEY.

THE NORRIS PETERS CO., WASHINGTON, D. C.

No. 11,939. Reissued Oct. 15, 1901.

J. F. OHMER.

MECHANISM FOR OPERATING FARE REGISTERS.

(Application filed Feb. 20, 1901.)

3 Sheets—Sheet 2.

WITNESSES.
Matthew Siebler.
C. M. Thorsard.

John F. Ohmer,
INVENTOR.
By R. J. McCarty,
ATTORNEY

THE NORRIS PETERS CO., WASHINGTON, D. C.

No. 11,939. Reissued Oct. 15, 1901.

J. F. OHMER.

MECHANISM FOR OPERATING FARE REGISTERS.

(Application filed Feb. 20, 1901.)

3 Sheets—Sheet 3.

WITNESSES.

Matthew Sibler.

C. M. Theobald.

John F. Ohmer.

INVENTOR

By R. J. McCarty.

ATTORNEY

THE NORRIS PETERS CO., WASHINGTON, D. C.

UNITED STATES PATENT OFFICE.

JOHN F. OHMER, OF DAYTON, OHIO.

MECHANISM FOR OPERATING FARE-REGISTERS.

SPECIFICATION forming part of Reissued Letters Patent No. 11,939, dated October 15, 1901.

Original No. 582,365, dated May 11, 1897. Application for reissue filed February 20, 1901. Serial No. 48,068.

*To all whom it may concern:*

Be it known that I, JOHN F. OHMER, a citizen of the United States, residing at Dayton, in the county of Montgomery and State of Ohio, have invented certain new and useful Improvements in Mechanism for Operating Fare-Registers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to means for actuating a variety of mechanisms for various purposes through the movement of a single primary element.

The principal feature of the invention comprises means for operating a fare-register for street-cars—such, for example, as the fare-register shown and described in Reissue Patents Nos. 11,842 and 11,681.

The object of the invention is to provide one primary actuating-piece through which any one of the ropes may be operated to register and indicate the various fares, thereby dispensing with the necessity of having the ropes extending through the car to positions where they might be caught hold of by the hand.

A further object of the invention is to provide means for simultaneously indicating the fares at the register and other points of the car—for example, at the rear or front platform or at both platforms.

In a detailed description of the invention the accompanying drawings are referred to, of which—

Figure 2:
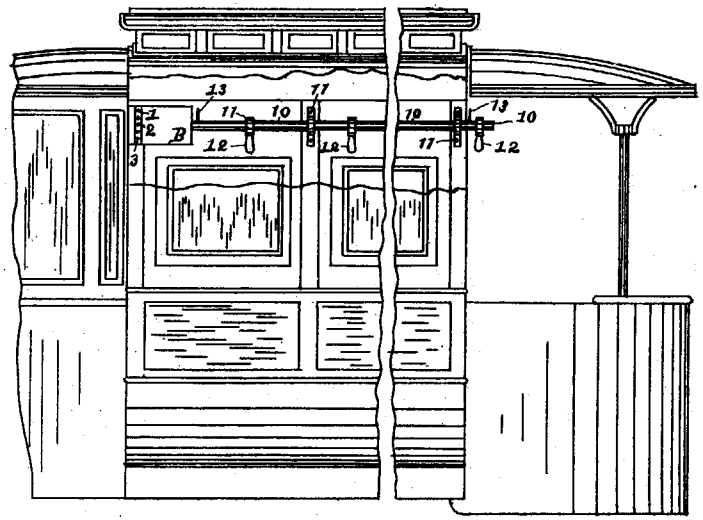
Figure 1:
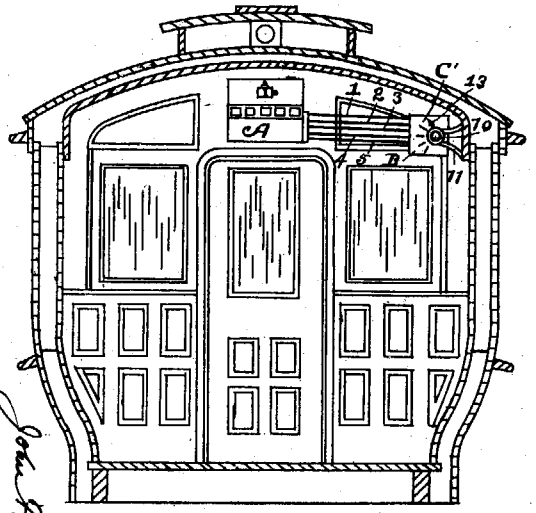
Figure 3:
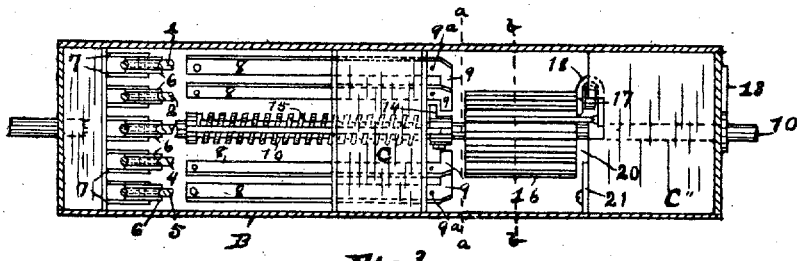
Figure 4:
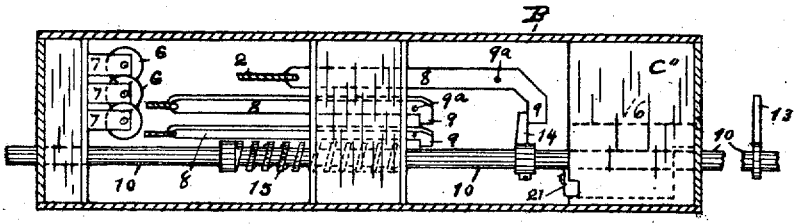
Figure 5:
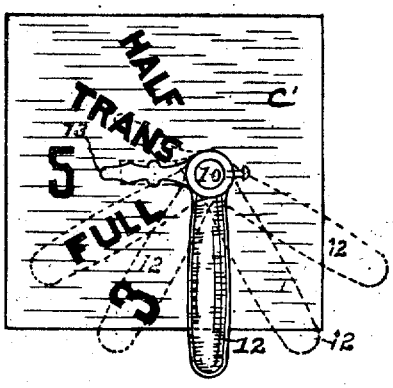
Figure 6:
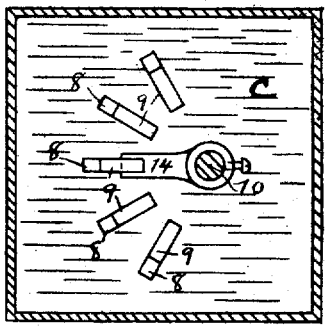
Figure 7:
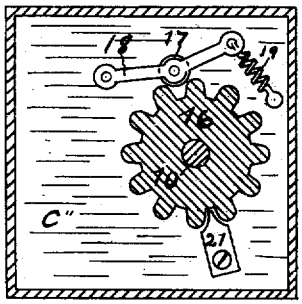
Figure 8:
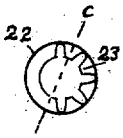
Figure 8A:
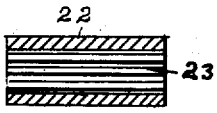
Figure 9:
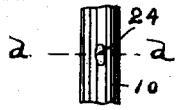
Figure 9A:
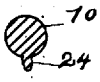
Figure 10:
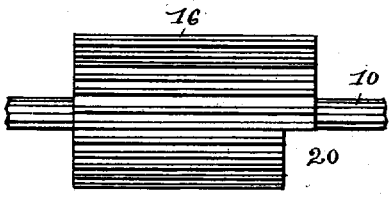

Figure 1 is a sectional view of the interior of the front end of the car with my invention partly shown. Fig. 2 is a side elevation of a car having my invention therein, parts of the car being broken away. Fig. 3 is an enlarged side elevation of part of the mechanism, the inclosing case appearing in section. Fig. 4 is a top view of Fig. 3. Fig. 5 is an enlarged front elevation of the case shown in Figs. 3 and 4, upon which the fares are indicated. Fig. 6 is an enlarged section on the line *a a* of Fig. 3. Fig. 7 is an enlarged section on the line *b b* of Fig. 3. Fig. 8 is an end view of an interiorly-toothed sleeve. Fig. 8ª is a longitudinal section of said sleeve on line *c c* of Fig. 8. Fig. 9 is a view of a portion of the sliding rod. Fig. 9ª is a section of said rod on line *d d* of Fig. 9. Fig. 10 is an enlarged elevation of an elongated spur-gear.

Similar reference characters indicate corresponding parts.

Referring to Figs. 1 and 2, A designates a fare-register, which may be placed at any convenient point in the car, usually at the front end. This register is of the type which are provided with a number of ropes or cables 1, 2, 3, 4, and 5, each one of which is associated with and adapted to register and indicate a specific fare. For example, one of said ropes is connected with the mechanism of the full-fare series and another rope is connected with the mechanism of the half-fare series, and so on. In the application of the present invention I am enabled to terminate these several ropes or cables a short distance from the fare-register, at which point they enter a case B, which is suitably mounted adjacent to the fare-register, and pass over a series of pulleys 6, which are mounted in bearings 7. The ends of each of the ropes are connected to a respective slide 8, of which the number employed corresponds to the number of ropes and pulleys. These slides are mounted to slide freely in openings in a block C, and their opposite ends 9 terminate on an angle to their bodies in order that they may engage with a device hereinafter described.

As shown in the various views, more especially Fig. 6, the slides 8 occupy a part of a circle, which is also true of the pulleys 6, over which the ropes pass.

The means for actuating the slides consist of the following devices: 10 designates a continuous rod which may be rotated about its longitudinal axis and also subjected to a horizontally-sliding movement. The said rod passes through the case B, runs the entire length of the car, and may be projected through the rear end of the car and operated from the rear platform, as shown in Fig. 2. The mounting of said rod may be in any part of the car, as found most expedient. In the drawings I have shown it mounted in an upper side of the car and slidingly supported in a series of brackets 11. 12 designates a series of handles attached to said rod at suitable distances apart, by means of which said rod is operated to register and indicate the fares.

C′ designates an indicating-dial on the exposed end of the case B. This dial, as shown in Fig. 5, indicates the various fares in a part of a circle coinciding with the positions of the slides 8 and pulleys 6. Similar indicating-dials may be placed at other points on the interior of the car or on the outer front and rear ends, so that the registration of fares may be witnessed by persons on the platforms of the car.

13 designates a pointer which is fixed to the rod 10. There is necessarily one of these pointers wherever a dial is placed. In the present illustration of the invention I have placed one of said pointers at the rear platform and one on the case B.

Describing more particularly the means for actuating each of the slides 8, 14 designates a finger adjustably or otherwise attached to the rod 10. As the said rod is rotated about its axis this finger is brought in a position to engage with the end 9 of any one of said slides, as may be directed on the dial by the position of the pointer. For example, if it is desired to register and indicate a full fare the rod 10 is turned until the pointer moves in line with that indication on the dial. The finger 14 is correspondingly moved to a position to engage with the slide 8, that operates the full-fare series in the register. The rod 10 is then slid outwardly, carrying therewith the slide, as shown in Fig. 4. Each slide after being drawn outwardly to its limit is returned to its inner or normal position by the action upon the rope of a resetting-spring inclosed in the fare-register. Pins 9ª on the slides limit their inward movement. The rod 10 is returned to its normal or inner position by the action of a resetting-spring 15, which surrounds said rod.

In the movement of the rod 10 to a position to register and indicate the desired fare I have provided means for arresting said movement sufficiently to enable the pointer to readily stop in line with the indication of the fare to be registered. This means consists of an elongated spur-gear 16, which is rigidly mounted on the rod 10 in line with an opening of similar diameter in the block C″. This latter opening provides space for said spur-gear to enter when the rod 10 is drawn outwardly to operate a slide.

17 designates an antifriction-roller which engages with the spur-gear to arrest the movement thereof by dropping into the space between the teeth. The resistance thus offered by the roller is of course only sufficient to arrest any movement of the gear that might be due to momentum. This roller 17 is mounted in a pivotal frame 18, which is drawn toward the gear by a helical spring 19 (see Fig. 7) to maintain a suitable contact between the roller and gear. As the gear is moved to the extent of each tooth the roller 17 will cause a stoppage of the gear sufficiently perceptible to the person operating the rod 10 from any part of the car.

It will be understood that the movement of the rod 10 is governed by the position of the pointer 13, and the purpose of the spur-gear and roller is to hold the rod in position. For example, referring to Fig. 5, if "5" is to be registered and indicated at the fare-register the rod 10 is rotated by one of the handles 12 until the pointer 13 points to "5" on either the dial on the case B, rear end of the car, or elsewhere. It will be observed that only a portion of the teeth of the spur-gear are useful in carrying out the function of said gear. Therefore a portion of the gear is cut away, as at 20, to provide a clearance for the detent 21, which is rigidly attached to the block C″. The object of this detent is to arrest any outward movement of the rod 10 until a full movement of the finger 14 from one indication to another is made upon the dial. When the rod 10 is moved to the full extent of the space between each two of the indications, the detent will be in line with the space between the teeth on the gear, as shown in Fig. 7. The said detent also prevents any axial movement of the rod 10 as the latter is being drawn out to register a fare. Other means may be employed for arresting the movement of said rod. Figs. 8, 9, 10, and 11 show a modification of these means, which consists of a sleeve 22, provided with internal teeth or ridges 23. This sleeve may be placed in any convenient part of the case B. For example, the block C″ may be lengthened and the sleeve placed therein. The rod 10 passes through said sleeve and is provided with a lug or tooth 24, that lies on the outside of the inner end of the sleeve. When the rod 10 is moved to bring the pointer 13 in line with any one of the indications on the dial, the lug 24 will be in line with the space between the ridges 23. There will consequently be no resistance to the movement of the rod.

It is apparent that the mechanism described in the foregoing specification might be employed for other purposes than as means for operating street-car fare-registers. For example, it may be found useful in stores as a means for operating a cash-register from distant points, thus limiting the number of cash-registers necessary by making it possible to operate a single register from various parts of the store.

Realizing the variety of uses to which my invention may be applied, I desire to claim, broadly, a plurality of slides any one of which may be actuated by the movement of a single element.

Having fully described my invention, I claim as new and desire to secure by Letters Patent—

1. In an operating device for fare-registers, the combination of a series of movable parts, an operating-rod attached to a car and capable of being operated from any part of said car, and susceptible of both rotary and longitudinal movements, means on said rod for engaging with any one of such movable parts when said rod is rotated, and whereby the said movable part so engaged is actuated by a longitudinal movement of the rod to actuate a specific set of mechanisms in the register.

2. A plurality of slides radially mounted, in combination with a sliding rod, and a finger on said rod adapted to be operated from various parts of a car, that may be moved in a position to engage with any one of said slides to impart movement thereto.

3. The combination with a plurality of ropes or cables, of a series of angular slides to which said ropes are attached, a rotary and sliding rod mounted parallel with said slides, and means on said rod adapted to engage with any one of said slides to impart movement thereto.

4. The combination with a plurality of ropes or cables, of a series of angular slides mounted in a part of a circle and to which said ropes are attached, a rod movable rotatably and longitudinally, and an engaging piece on said rod adapted to engage with any one of said slides to impart movement thereto.

5. The combination with a plurality of ropes or cables, of a series of angular slides mounted in a part of a circle, and to which said ropes are attached, a rod movable both rotatably and longitudinally, an engaging piece on said rod adapted to interlock with any one of said slides, and means for controlling the movements of said rod, substantially as described.

6. The combination with a plurality of ropes or cables, of a series of slides arranged in a part of a circle, and to which said ropes are attached, a rod movable both rotatably and longitudinally, an engaging piece on said rod adapted to engage with any one of said slides to impart a sliding movement thereto, one or more pointers on said rod, and one or more dials to indicate the desired axial movement of said rod.

7. The combination with a plurality of ropes or cables, of a series of slides mounted in a part of a circle, and to which said ropes are attached, a rod movable both rotatably and longitudinally, a finger projecting from said rod and adapted to be brought into a position to engage with any one of said slides by turning said rod, a spur-gear rigid on said rod, and an antifriction-roller adapted to engage with said spur-gear to arrest the movement of said rod.

8. The combination with a plurality of ropes or cables, of a series of slides having shoulders or stops thereon, and mounted in a segment of a circle, a rotary and sliding rod mounted in the center of said circle and parallel with said slides, an engaging piece on said rod adapted to be brought into a position to engage with any one of said slides to impart an outward-sliding movement thereto, and means for returning said slides and rod to their inner or normal positions.

9. In mechanism for operating fare-registers, the combination of a plurality of sliding members mounted in an arc of a circle, individual connections between said sliding members and the mechanisms of a fare-register, an operating-rod attached to a car and movable both rotatably and longitudinally from any part of said car, means along said rod for indicating the extent of its rotary movements, means on said rod adapted to be brought into a position in the rotary movement of said rod, to engage with a desired one of said sliding members, the rotary movement of said rod necessary to effect an engagement with a selected one of said sliding members, being determined by the means for indicating the extent of the rotary movements of such rod, and means for preventing an overthrow of said rod in its rotary movements.

10. In mechanism for operating fare-registers, the combination of a series of slides mounted in a part of a circle, and each one of which is connected with a definite set of mechanism in a register, a rod mounted in a car and susceptible of rotary and longitudinal movements and being capable of operation from any part of a car, means on said rod adapted to be brought into position, in the rotary movements thereof, to engage with any one of said slides, and whereby a desired set of fare-register mechanism is selected for operation by a longitudinal movement of said rod, and means whereby the desired rotary movement of said rod is determined.

11. The combination with a plurality of ropes or cables passing over a corresponding number of pulleys arranged in a part of a circle, of a series of slides mounted in a part of a circle, and to which said ropes are attached, a rod movable rotatably and horizontally, and mounted in the center of said circle, a finger projecting from said rod adapted to be moved into position to engage with any one of said slides, one or more pointers fixed to said rod in line with said finger, and one or more dials bearing indications to which said pointers point, and means for resetting said slides and rod to their normal positions.

12. The combination with a fare-register of the type described, of a plurality of slides mounted in a segment of a circle adjacent to said fare-register, connections between said slides and the interior mechanism of the fare-register, a rod movable rotatably and horizontally and mounted parallel with said slides, a finger projecting from said rod, and adapted to be moved into a position to engage with any one of said slides, one or more pointers fixed to said rod, one or more dials bearing indications to which said pointers point, and means for controlling the axial and horizontal movement of said rod.

13. The combination with a series of ropes or cables, of a corresponding number of engaging parts to which said ropes or cables are connected; a rod adapted to be rotated, and moved longitudinally; a projection on said rod adapted to be brought into a position to engage with any one of said engaging parts when the rod is rotated, and through which the said ropes or cables may be singly actuated by each longitudinal movement of said rod.

14. In mechanism for operating fare-registers, an operating-rod extending on the interior of a car and movable both rotatably and longitudinally, means for effecting connections at will, between said operating-rod and the mechanisms of a fare-register, when said rod is rotated, and whereby a selected mechanism of said register is actuated to register a fare when said rod is moved longitudinally.

15. In mechanism for operating fare-registers, the combination of a series of sliding members arranged in an arc of a circle, connections between such members and the register mechanisms, a rotatably and longitudinally movable rod, the said rod being attached to a car and adapted to be operated from any part of said car, means on said rod adapted to be brought into positions in the rotary movements thereof to engage with a desired one of said sliding members, and whereby the said desired one of such sliding members is actuated by a longitudinal movement of said rod to transmit the necessary movements to the register mechanisms.

16. The combination with a fare-register, of a series of sliding members, each of which is connected to a definite set of mechanism within said register, an operating-rod movable both rotatably and longitudinally, means on said rod adapted to be brought into a position in the rotation of such rod, to engage with a desired one of said sliding members, and whereby an operation of such sliding member is effected by a longitudinal movement of such rod, a plurality of pointers fixed to said rod, and a plurality of dials bearing indications to which said pointers are moved in the rotation of said rod, and whereby the desired extent of rotation to be imparted to said rod is ascertained.

17. In an operating device for fare-registers, the combination of a series of movable parts each of which is adapted to operate a separate and independent set of register mechanism, an operating-rod adapted to be moved to positions to engage any one of said movable parts and to be moved to actuate the movable part so engaged to transmit motion to the set of register mechanism operated by such movable part, one or more pointers on said rod, and one or more dials bearing indications to which said pointers are moved in the movements of the rod to positions to engage with said movable parts.

18. The combination with a fare-register, of an operating rod or handle capable of being operated from various parts of a car and having both rotary and longitudinal movements to indicate a desired fare at exterior points of such register, and to actuate the mechanism of such register, and means interposed between such operating rod or handle and the mechanism of such register, whereby the necessary movements are transmitted.

In testimony whereof I affix my signature in presence of two witnesses.

JOHN F. OHMER.

Witnesses:
JOHN W. KALBFUS,
R. J. MCCARTY.